US010634806B2

(12) United States Patent
Hartland (10) Patent No.: US 10,634,806 B2
(45) Date of Patent: Apr. 28, 2020

(54) WAVEGATE FOR A SEISMIC SURFACE VESSEL

(71) Applicant: Seabed Geosolutions B.V., Leidschendam (NL)

(72) Inventor: Martin John Hartland, Katy, TX (US)

(73) Assignee: Seabed Geosolutions B.V., Leidschendam (NL)

( * ) Notice: Subject to any disclaimer, the term of this patent is extended or adjusted under 35 U.S.C. 154(b) by 330 days.

(21) Appl. No.: 15/681,979

(22) Filed: Aug. 21, 2017

(65) Prior Publication Data

US 2018/0052246 A1 Feb. 22, 2018

Related U.S. Application Data

(60) Provisional application No. 62/378,115, filed on Aug. 22, 2016.

(51) Int. Cl.
*G01V 1/38* (2006.01)
*B63B 19/08* (2006.01)
*B63B 35/00* (2020.01)

(52) U.S. Cl.
CPC ............ *G01V 1/3843* (2013.01); *B63B 19/08* (2013.01); *G01V 1/3808* (2013.01);
(Continued)

(58) Field of Classification Search
CPC .. G01V 1/3843; G01V 1/3808; G01V 1/3817; B63B 2035/007; B63B 2019/086; B63B 2019/08
(Continued)

(56) References Cited

U.S. PATENT DOCUMENTS 2,386,650 A * 10/1945 Bell .................... B63B 19/08
114/259
3,937,296 A * 2/1976 Larson ................. G01V 1/104
181/118
(Continued)

FOREIGN PATENT DOCUMENTS

CA 2990830 A1 * 1/2017 ............ G01V 1/168
CN 202896838 4/2013

OTHER PUBLICATIONS

Notification of Transmittal of the International Search Report and the Written Opinion of the International Searching Authority, or the Declaration, PCT—International Searching Authority, dated Oct. 24, 2017.

*Primary Examiner* — Forrest M Phillips
(74) *Attorney, Agent, or Firm* — Park, Vaughan, Fleming & Dowler LLP; Shane Nelson (57) ABSTRACT

One or more wavegates are located on a seismic surface vessel to substantially prevent or limit waves from crashing onto a back deck of the vessel. The wavegate may comprise one or more steel gates or doors located at or near the aft portion of the vessel, such as on or near the rear end of the back deck, that may be moveable between a closed position and an open position. Each door may be fixed in position and/or be rotated and/or moveable in a horizontal and/or vertical direction between different positions. The wavegate allows the surface vessel to travel backwards and/or in the face of incoming waves while substantially preventing and/or limiting waves from crashing onto the back deck of the marine vessel. The seismic surface vessel may be a deployment vessel or a hybrid seismic shooting and deployment vessel or another marine surface vessel.

20 Claims, 6 Drawing Sheets

(52) U.S. Cl.
CPC .......... *G01V 1/3817* (2013.01); *G01V 1/3852* (2013.01); *B63B 2019/086* (2013.01); *B63B 2035/007* (2013.01)

(58) Field of Classification Search
USPC ........................................................ 181/114
See application file for complete search history.

(56) References Cited

U.S. PATENT DOCUMENTS

| | | | | |
|---|---|---|---|---|
| 3,949,831 | A * | 4/1976 | Cassand | G01V 1/135 |
| | | | | 181/120 |
| 6,464,035 | B1 * | 10/2002 | Chelminski | G01V 1/135 |
| | | | | 181/114 |
| 6,823,262 | B2 * | 11/2004 | Bahorich | G01V 1/147 |
| | | | | 181/114 |
| 6,843,198 | B1 * | 1/2005 | Witbeck | B63B 25/006 |
| | | | | 114/258 |
| 8,570,835 | B2 * | 10/2013 | Chelminski | G01V 1/135 |
| | | | | 181/114 |
| 2010/0054896 | A1 | 3/2010 | Lababidy | |
| 2012/0218865 | A1 * | 8/2012 | Dinter | G01V 1/3843 |
| | | | | 367/87 |
| 2017/0293042 | A1 * | 10/2017 | Dudley | G01V 1/3808 |
| 2019/0120982 | A1 * | 4/2019 | Sollner | G01V 1/006 |

\* cited by examiner

WAVEGATE FOR A SEISMIC SURFACE VESSEL

PRIORITY

This application claims priority to U.S. provisional patent application No. 62/378,115, filed on Aug. 22, 2016, the entire content of which is incorporated herein by reference.

BACKGROUND OF THE INVENTION

Field of the Invention

This invention relates to seismology and more particularly relates to the deployment of seismic nodes by the use of one or more wavegates on the back deck of a marine vessel.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. See, e.g., U.S. patent Publication No. US20160041280 (citing patents and publications), incorporated herein by reference. Still further, the autonomous seismic nodes may be integrated with an AUV such that the AUV, at some point subsea, may either travel to or from the seabed at a predetermined position. See, e.g., U.S. Pat. No. 9,090,319, incorporated herein by reference. In general, the basic structure and operation of an autonomous seismic node and a seismic AUV is well known to those of ordinary skill.

A seismic deployment and survey operation generally requires one or more surface vessels that act as a source (or shooting) vessel and one or more surface vessels that deploy and/or retrieve the autonomous seismic nodes from the ocean bottom. See, e.g., U.S. Pat. No. 9,090,319, incorporated herein by reference. Generally, a deployment vessel stores a plurality of autonomous seismic nodes and a separate shooting vessel may be used to generate seismic waves. The shooting vessel may tow one or more seismic source arrays, each one including plural source elements. A source element may be an impulsive element (e.g., a gun) or a vibratory element. However, each vessel costs significantly more money to operate, and the use of two or three vessels as opposed to one vessel is much more expensive and, at least in some instances, more time consuming to perform the survey operation.

It is desirable to perform marine seismic surveys in a fast and cost-effective manner. Thus, in some situations it may be desirable to utilize a single vessel for both the deployment (and potentially retrieval) of nodes and as a source vessel for the survey. However, typical seismic vessels do not work well as both a seismic source and deployment vessel. Deployment vessels typically have their back (or aft) portion of the vessel open such that it is exposed to waves from the ocean. While forward movement of the ocean may not typically create waves on the back deck of vessel, or at least waves significant enough to prevent deployment and/or seismic operations, the vessel cannot travel backwards as waves would come across the back deck of the vessel and prevent surface operations and cause increased safety risks. In other words, moving backwards or in a direction and/or maintaining a position in the flow of the tide creates significant safety concerns as the waves crash onto the back deck, thereby preventing most survey operations from moving backwards or in the face of incoming waves. This acts as a significant operational limitation to the survey. Based on the engine configuration of many seismic vessels or vessels of opportunity, it is much easier to stay in a fixed position or intended direction when moving backwards, however existing vessels cannot deploy and/or shoot acoustic signals for a seismic survey while moving backwards.

A need exists for an improved method and system for deploying seismic nodes on the ocean bottom by the use of a single vessel. A need exists for an improved hybrid seismic source and deployment vessel. A need exists for a vessel to move backwards and/or in the face of incoming waves in the ocean during different seismic and/or deployment operations. A need exists to prevent and/or limit waves from hindering back deck operations of a marine vessel and to increase the safety of back deck operations, particularly during seismic operations such as the deployment and recovery of seismic nodes.

SUMMARY OF THE INVENTION

One or more wavegates are located on a seismic surface vessel to substantially prevent or limit waves from crashing onto a back deck of the vessel. The wavegate may comprise one or more steel gates or doors located at or near the aft portion of the vessel, such as on or near the rear end of the back deck, that may be moveable between a closed position and an open position. Each door may be fixed in position and/or be rotated and/or moveable in a horizontal and/or vertical direction between different positions. The wavegate allows the surface vessel to travel backwards and/or in the face of incoming waves while substantially preventing and/or limiting waves from crashing onto the back deck of the marine vessel. The seismic surface vessel may be a deployment vessel or a hybrid seismic shooting and deployment vessel or another marine surface vessel.

A system for the deployment of seismic nodes in a body of water is disclosed that comprises one or more wavegates located on or near an aft portion of a back deck of a seismic surface vessel. The one or more wavegates may be moveable between a closed position and an open position. In one embodiment, the closed position substantially prevents waves from crashing onto the back deck of the surface vessel during vessel operations. The one or more wavegates is configured to prevent waves from substantially crashing onto the back deck of the marine vessel while the surface vessel travels backwards and/or in the face of incoming waves. The surface vessel may be a hybrid seismic shooting and deployment vessel, or just a shooting vessel or a deployment vessel or a retrieval vessel. The disclosed system may further include one or more ROV deployment systems located on the back deck at a first location and one or more subsea basket deployment systems located on the back deck at a second location. In one embodiment, the second location is located astern to the first location.

In one embodiment, the one or more wavegates comprises a plurality of doors. The plurality of doors may form an obtuse angle in the closed position in relation to a back edge of the vessel. Each of the plurality of doors may be located on an opposite side of the surface vessel in the open position or in a substantially flat position along the back deck of surface vessel in the open position. In one embodiment, the closed position comprises a substantially straight wall section formed by the one or more wavegates that is substantially perpendicular to the length of the vessel.

The wavegate(s) may take a variety of shapes, forms, and configurations. For example, the one or more wavegates may comprise a plurality of wavegates and an open section located between the plurality of wavegates sized for allowing subsea equipment to be raised and lowered from the back deck of the marine vessel through the open section, such as deployment lines or acoustic sources or other subsea devices. The wavegate may be coupled to at least one actuating device that is configured to move the wavegate between an open position and a closed position, such as a hinge and/or a cylinder. The wavegate may be approximately between one to five meters tall. A width of the wavegate may be approximately ½ to substantially all of the width of the back deck of the marine vessel. The one or more wavegates may comprises two wavegates, wherein a width of each of the two wavegates is approximately ¼ to ½ the width of the back deck of the marine vessel.

Also disclosed is a method for the deployment of seismic nodes in a body of water, comprising deploying a plurality of autonomous seismic nodes in a body of water from a marine surface vessel and preventing waves from substantially hitting the back deck of the marine vessel by using one or more wavegates located on the back deck of the marine vessel while deploying the plurality of autonomous seismic nodes. The method may include moving the one or more wavegates from an open position to a closed position for deployment of the plurality of autonomous seismic nodes. The method may also include shooting one or more acoustic signals into the body of water from the surface vessel while the one or more wavegates are in a closed position. The surface vessel may be operated in a variety of directions, such as in a direction that causes waves to hit the back deck of the surface vessel while the one or more wavegates are in a closed position. In one embodiment, the direction of the surface vessel is substantially backwards, while in another embodiment the direction is in the face of incoming waves.

The use of the wavegate is not limited to the deployment of autonomous seismic nodes or other seismic operations. For example, also is disclosed a method for the deployment of subsea devices in a body of water, comprising deploying one or more subsea devices in a body of water from a marine surface vessel and preventing waves from substantially hitting the back deck of the marine vessel by using one or more wavegates located on the back deck of the marine vessel while performing subsea operations with the one or more subsea devices.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

System and Operation

The disclosed wavegate may be used on a wide variety of marine vessels, but is particularly suited for seismic surveys and related seismic operations. In one embodiment, the disclosed seismic surface vessel is a shooting vessel configured to deploy an acoustic source from the back deck of the surface vessel. In another embodiment, the disclosed seismic surface vessel is a deployment vessel configured to deploy a plurality of autonomous seismic nodes to the seabed. In still another embodiment, the disclosed seismic surface vessel is both a seismic source vessel and a deployment vessel.

Figure 1:
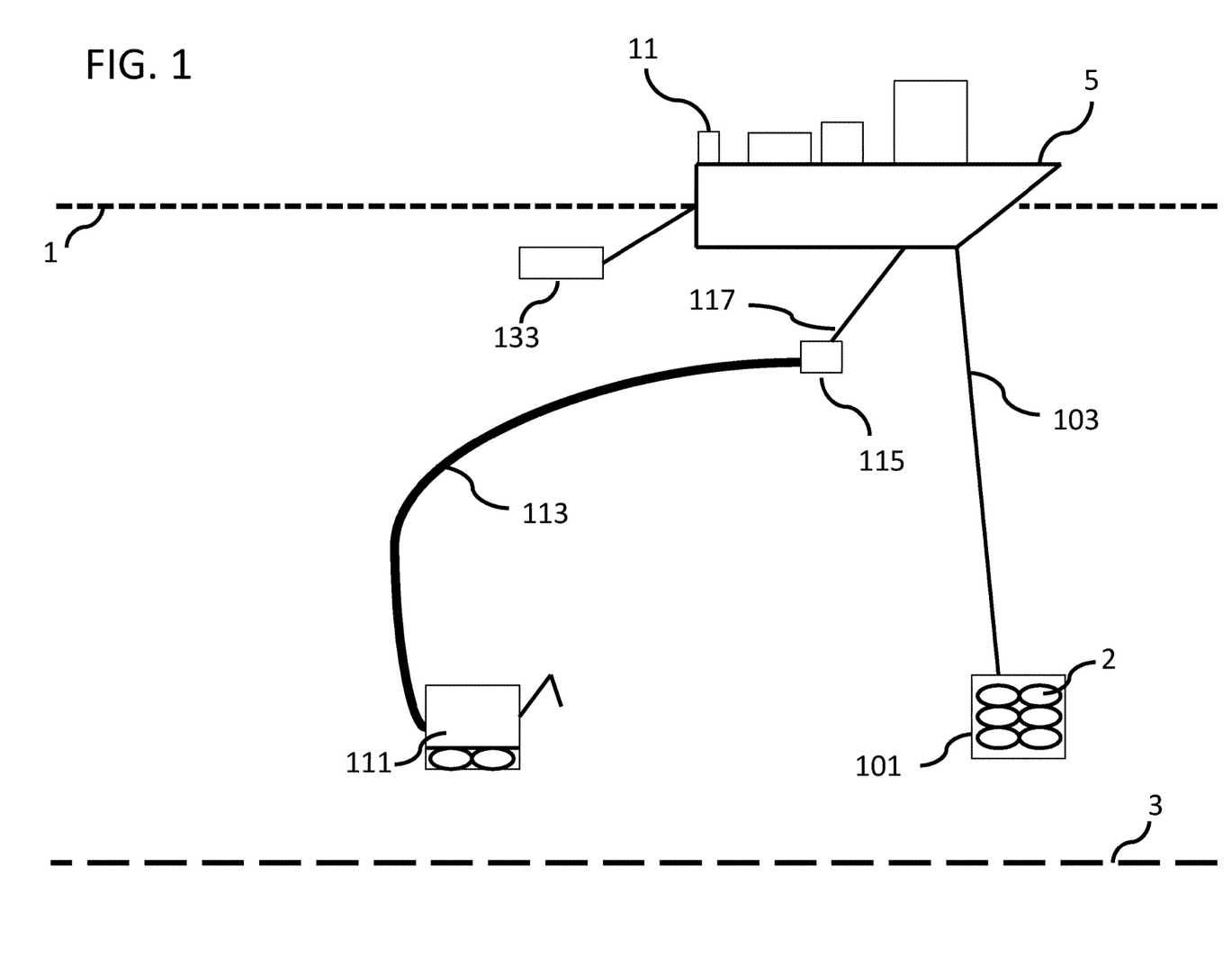
FIG. 1 illustrates one embodiment of a hybrid seismic source and deployment vessel for a plurality of autonomous seismic nodes.

FIG. 1 shows one example of hybrid seismic shooting and deployment vessel 5 that may include wavegate 11 (discussed in more detail in the following figures). The hybrid vessel 5 may tow one or more seismic source arrays 133, each one including plural source elements. As is known in the art, a source element may be an impulsive element (e.g., a gun) or a vibratory element. In other embodiments, the vessel may just be a shooting vessel or a deployment vessel or a retrieval vessel. The vessel may also store the autonomous seismic units before and after a seismic survey, such as that disclosed in U.S. Pat. No. 9,459,366, incorporated herein by reference. In one embodiment, the number of autonomous seismic units is in the hundreds or even thousands. The hybrid vessel may also deploy and retrieve the autonomous seismic units from the back deck of the marine vessel to the ocean bottom floor. For example, the vessel may deploy ROV 111 via a deployment/tether line and cage or basket 101 (loaded with autonomous units 2) from the ship via deployment line 103. While only one ROV is illustrated in FIG. 1, a plurality of ROVs, AUVs, or other underwater vehicles may be used in other embodiments. In still other embodiments, the autonomous seismic units may be coupled to a deployment line and deployed without the need of an ROV or cage, such as that disclosed in U.S. Pat. No. 9,541,663, incorporated herein by reference.

In one embodiment, each ROV may be the FUGRO FCV3000, but other similar ROVs can be used as well. In general, the structure and operation of marine ROVs are well known to those of ordinary skill. For example, U.S. Publication No. US2015/0316675, incorporated herein by reference, describes a ROV configured to deploy and retrieve autonomous seismic nodes to the seabed with a separate AUV configured to monitor and exchange data with the seismic nodes. Likewise, U.S. Pat. No. 8,075,226, incorporated herein by reference, describes a ROV configured to physically deploy autonomous seismic nodes from a carrier located on the ROV as well as a basket lowered by a surface vessel and to connect the ROV to the lowered basket to transfer nodes from the basket to the ROV carrier. In other embodiments, an autonomous underwater vehicle (AUV) or another unmanned underwater vehicle (UUV) may be used instead of an ROV. Likewise, the structure and operation of an AUV is well known to those of ordinary skill. For example, Applicant's U.S. Pat. No. 9,090,319, incorporated herein by reference, discloses one type of autonomous underwater vehicle for marine seismic surveys. Applicant's U.S. Publication No. 2016/0121983, incorporated herein by reference, discusses the general components and configurations of ROVs and seismic AUVs, incorporated herein by reference. Of course, one of skill in the art realizes that the AUV or UUV (or ROV) for deploying seismic nodes to the seabed need not have any seismic sensors itself. While various ROVs, UUVs, or AUVs may be used with the embodiments presented in this disclosure, the invention is not limited to any particular underwater vehicle or configuration thereof to deploy the autonomous seismic nodes on the seabed.

In one embodiment, the surface vessel deploys subsea cage/basket 101 to a position on or near the seabed, or at some position subsea between the surface vessel and the seabed. In some embodiments, two or more subsea baskets may be deployed from the vessel. Subsea basket 101 may be utilized near the surface, at a subsea position between the seabed and the surface, near the seabed, or on the seabed. As is known in the art, ROV 111 is coupled to TMS 115 via tether 113 and TMS 115 is coupled to surface vessel 5 via umbilical cable 117. If necessary, additional ROVs may be similarly coupled to the surface vessel, each with a corresponding tether, TMS, and umbilical cable/line. In general, for the purposes of this disclosure, some or all of the portions of an ROV's tether and/or umbilical cable may be generally considered as the ROV's deployment line. As is known in the art, the tether management system (TMS) is coupled to the ROV during lowering and/or raising of the ROV through the splash zone from the surface vessel. The TMS has a tether winch that may lengthen and/or shorten the tether as appropriate. The umbilical cable provides power and data signals between the surface vessel and the TMS. The TMS relays data signals and/or power for the ROV through the tether line.

Basket/cage 101 may be lowered from surface vessel 5 via wire/cable 103 with a plurality of autonomous seismic nodes 2 (or other seismic payload devices) stored on the basket/cage for transfer with the ROV(s), such as disclosed in U.S. Pat. No. 6,975,560 and U.S. Patent Publication No. 2016/0121983, each incorporated herein by reference. Each ROV may be used to transfer seismic nodes 2 from cage 101 and deploy those seismic nodes to seabed 3 at predetermined positions. In one embodiment as shown in FIG. 1, the ROV may have a skid or other node storage system for storing a plurality of autonomous seismic nodes on the ROV. An ROV node storage system may be located on an underside of the ROV or may be located on a front, back, or side portion of the ROV. In the embodiment shown in FIG. 1, each of the ROVs has a plurality of nodes stored on a skid coupled to the ROV. In some embodiments, the nodes may be stored and/or handled by a plurality of grabbers, grippers, manipulators, or other single node handling devices. The present disclosure is not limited to any particular node holding device or node transfer device or basket coupling device. In other words, the nodes may be transferred to and from the baskets and the ROVs (and/or from the baskets to the seabed) in any number of configurations. In other embodiments, an autonomous underwater vehicle (AUV) or another unmanned underwater vehicle (UUV) may be used instead of an ROV.

In one embodiment, the deployment vessel may also tow and shoot source arrays as it deploys the autonomous seismic units. In some embodiments, the hybrid vessel first deploys the nodes and then after the desired number of nodes have been deployed then shoots the source arrays. When the autonomous seismic units are in a recording position (e.g., a predetermined number of seismic units are located at the appropriate positions on the seabed), seismic waves are generated (such as by acoustic sources 133) which are recorded by the seismic sensors on the autonomous seismic nodes. In one embodiment, the deployment vessel is configured to hold all of the autonomous seismic nodes at the beginning of the seismic survey and then to launch them as the survey advances. In some embodiments, a separate vessel is used to retrieve the seismic units. In still other embodiments, two hybrid vessels are used, each which is configured to deploy the seismic units and act as a shooting vessel.

Wavegate

Vessel 5 may have a left (port) and right (starboard) side, as well as a front (fore/bow) and back (aft/stern) side 6. In one embodiment, the hybrid deployment and source marine vessel described above in FIG. 1 comprises one or more wavegates located near or on the rear (or aft) end 6 of the back deck of the marine vessel. In particular, the vessel may comprise one or more steel gates or doors located near or at the aft portion of the vessel (e.g., a "wavegate"). In one embodiment, each door may be fixed in position, and in other embodiments, each of the doors may be rotated and/or moveable in a horizontal and/or vertical direction from a closed position to an open position (and vice versa). In one embodiment, the wavegate may comprise one or more movable or retractable transom bulwark sections that are sufficiently strengthened to withstand wave forces to the full height of the bulwark. In one embodiment, the closed position is a position of the wavegate that substantially prevents or limits waves from crashing onto the back deck of the vessel, and the open position is a position of the wavegate that allows waves to crash onto the back deck of the vessel and/or does not substantially prevent or limit waves from crashing onto the back deck.

As mentioned above, prior art seismic surveys typically use at least one deployment vessel to store and deploy a plurality of autonomous seismic nodes and a separate shooting vessel to generate seismic waves for the seismic survey. Further, typical seismic vessels cannot travel backwards and/or in the face of incoming waves for safety reasons and because of the inability to perform the required operations based on the incoming waves. For example, deployment vessels typically have their back (or aft) portion of the vessel open such that it is exposed to waves from the ocean. While forward movement of the ocean may not typically create waves on the back deck of the surface vessel, or at least waves significant enough to prevent deployment and/or seismic operations, the vessel cannot travel backwards as waves would come across the back deck of the vessel and prevent operations and cause increased safety risks. In other words, moving backwards or in a direction and/or maintaining a position in the flow of the tide creates significant safety concerns as the waves crash onto the back deck. This prevents most survey operations from moving backwards and/or in the face of incoming waves, which acts as an operational limitation to the survey.

Figure 2A:
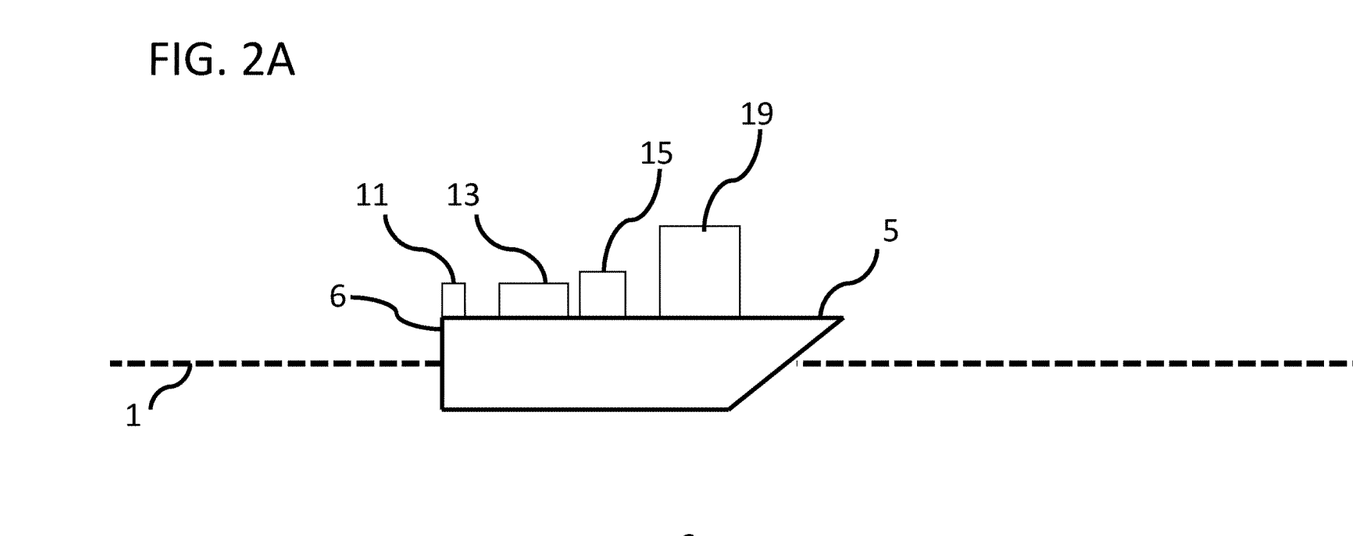
FIGS. 2A and 2B illustrate one embodiment of a seismic vessel with one or more wavegates.
Figure 2B:
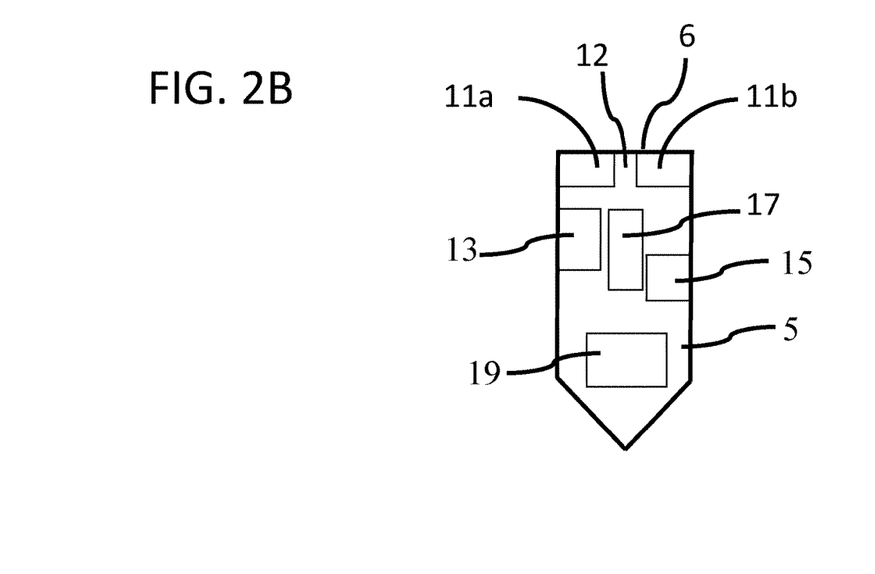

FIGS. 2A and 2B show one embodiment of a surface vessel 5 that includes wavegate 11 from a side and top view schematic, respectively. Wavegate 11 is installed near or at the rear end 6 of the back deck of the vessel. While the disclosed wavegate may be installed and used on any marine vessel, it is particularly applicable for seismic vessels that intend on staying still, moving backwards, and/or moving in a direction that may cause waves to interfere with back deck operations. In general, the disclosed wavegate provides a safer working deck environment not only for backwards moving vessels but also for any heading chosen, thereby allowing the surface vessel to optimize the deployment operation regardless of waves. Also, the wavegate may be used with any type of vessel operation and deployment operation, such as a hybrid shooting and deployment vessel or a deployment or a retrieval vessel, and whether the nodes are deployed with an ROV (or other underwater vehicle), a cage, and/or on a deployment line.

In one embodiment, as is known in the art, vessel 5 may have one or more Launch and Recovery Systems (LARS) (or other similar deployment systems) installed on the back deck for lowering/raising subsea equipment, such as ROVs, baskets, etc. For example, a first LARS system may be used to deploy an ROV (such as ROV 111) from station 15 and a second LARS system may be used to deploy a cage/basket loaded with seismic nodes (such as basket 101) from station 13. As is known in the art, autonomous seismic nodes may be loaded into basket 101 (such as via skids, conveyors, trays, etc.) and the basket lowered to a subsea position for coupling with ROV 111. In other embodiments, additional ROVs and baskets may be lowered from surface vessel 5. The surface vessel may also have a control section/operation room(s) 19 where the overall system and operation of the vessel, deployment of ROVs, deployment of cage, and deployment of seismic nodes are monitored and controlled. The present disclosure does not depend on the particular type (and number) of ROVs or subsea baskets used, or the particular transfer/docking between the ROV and the subsea basket system.

In one embodiment, the umbilical/tether connecting the ROV and/or tether management system (TMS) unit creates a higher drag force than a simple guide wire connecting the basket. Thus, with backwards travel of the surface vessel, in one embodiment the basket deployment systems 13 may be located astern (behind) the ROV deployment systems 15 on the back deck of the marine vessel. In other words, if an ROV deployment system is installed forward of the basket deployment system, it is necessary to move backwards to help avoid conflicts and line entangling between the lowered ROV and basket units. Such a backwards operation is typically not possible (and/or at least not safe) in conventional deployment ships.

FIG. 2B shows a top view simplified schematic of the hybrid vessel 5 from FIG. 2A. As shown, in one embodiment, there may be a plurality of wavegates 11a, 11b on the back deck of the vessel. In one embodiment, an open space 12 is located between the plurality of wavegates, which allows a deployment line or other operation (such as acoustic source deployment) to be conducted between the wavegates while they are in a closed position. In other embodiments, each wavegate 11a and 11b may comprise a plurality of doors, as shown in more detail in FIG. 3C. In one embodiment, the vessel may have one or more containers or deployment systems 17 that stores, handles, deploys, and retrieves any acoustic system deployed from the vessel, such as may be necessary when using a hybrid shooting and deployment vessel. In other embodiments (not shown) a deployment system may also be located on the back deck of the vessel that stores and handles the autonomous seismic nodes before and/or after transfer to basket system 13 or a deployment line. Of course, other configurations of the wavegate on the back deck of the marine vessel are possible within the scope of the present disclosure.

Figure 3A:
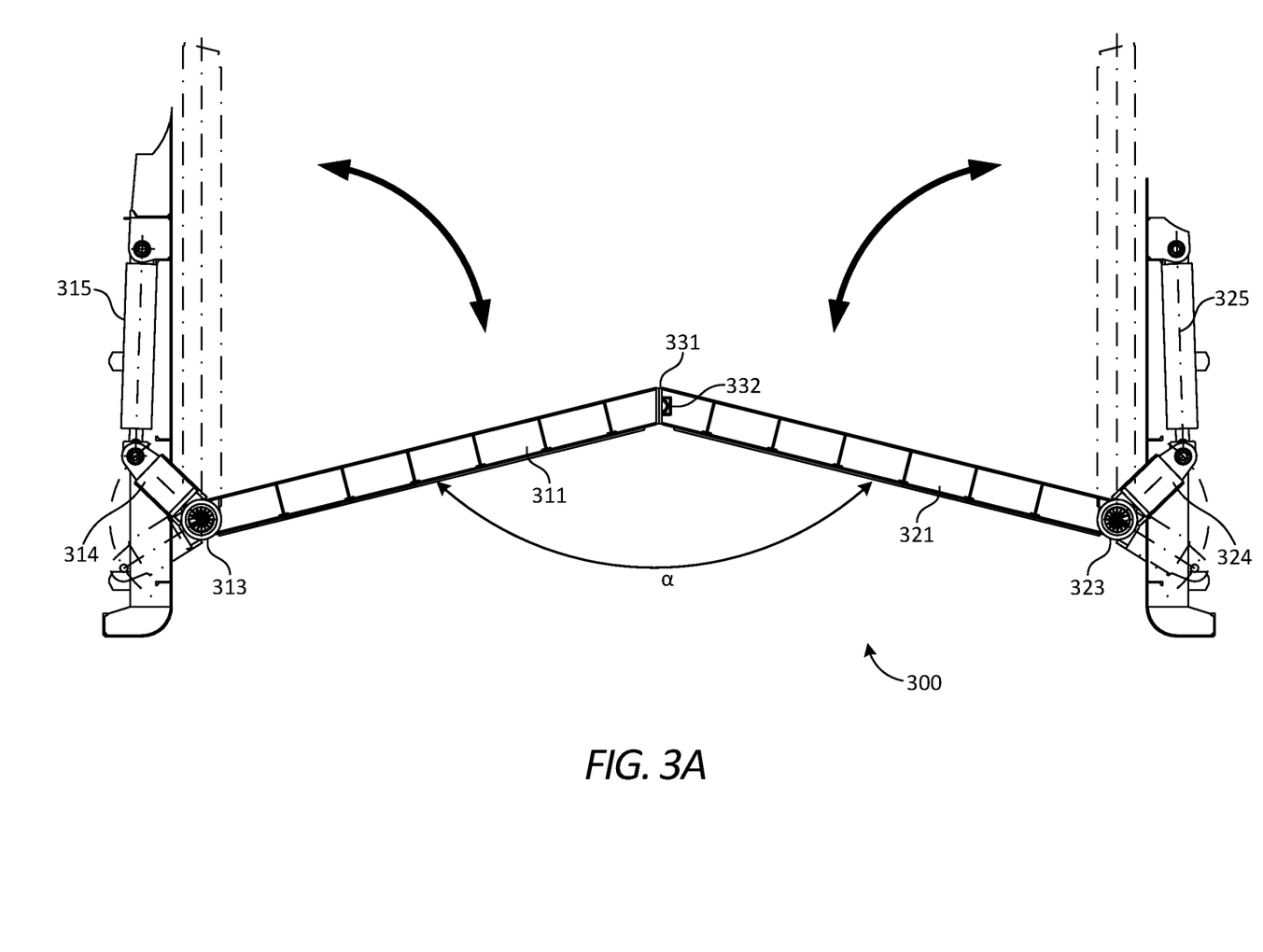
FIGS. 3A, 3B, and 3C illustrate one embodiment of a wavegate.
Figure 3B:
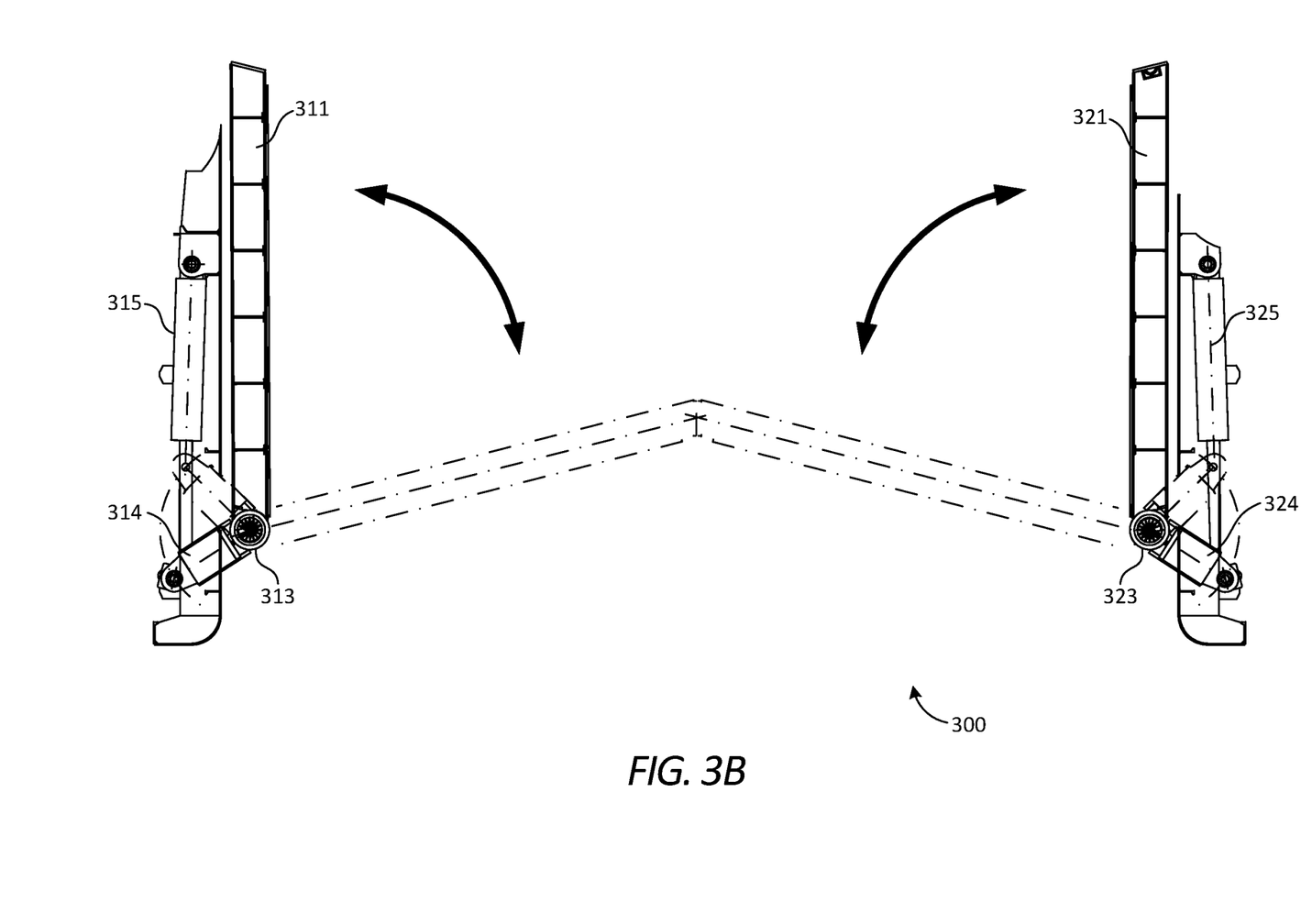
Figure 3C:
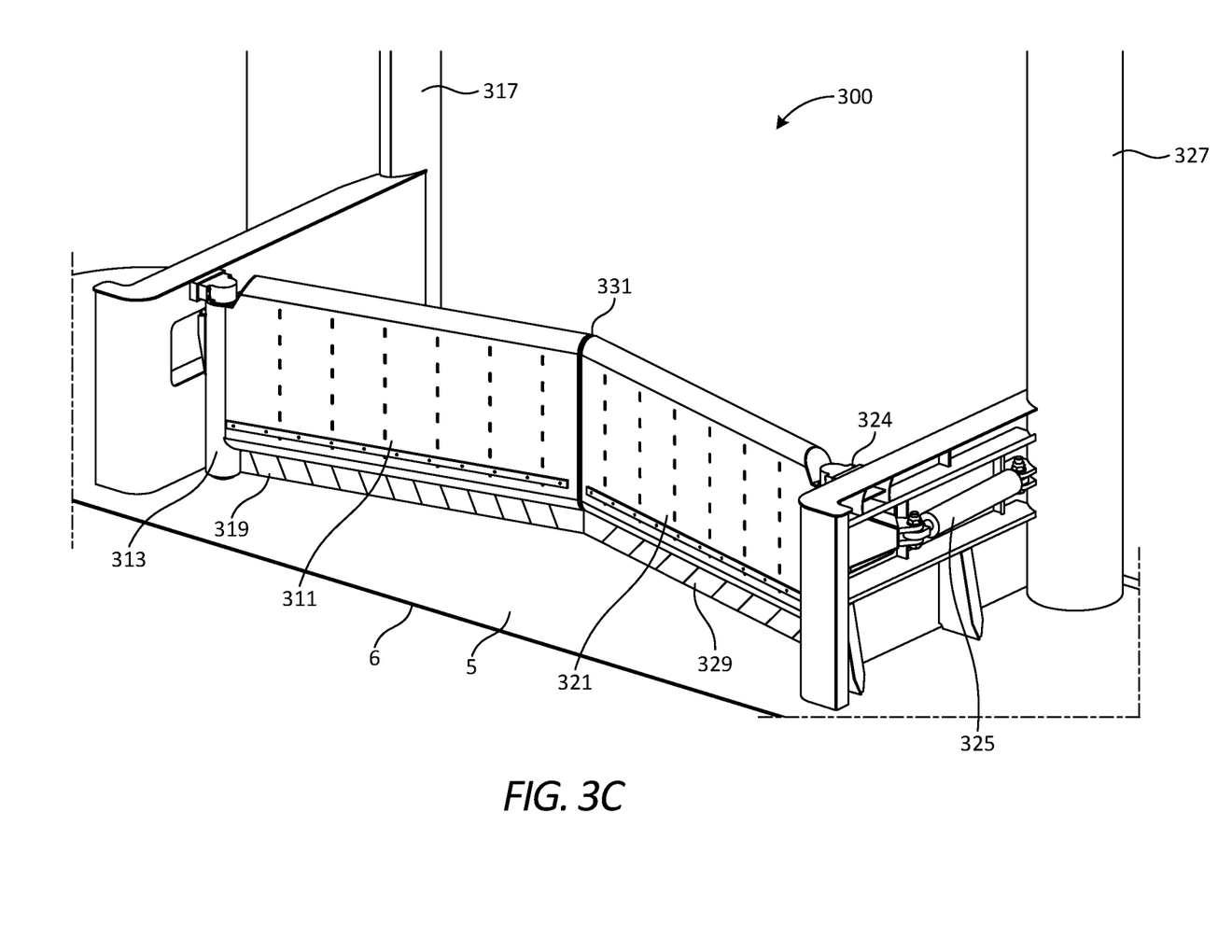

FIGS. 3A and 3B illustrate a top view schematic of one embodiment of a wavegate in a closed and opened position, respectively. The wavegate may be located at or near the rear portion of the back deck of a surface vessel. For simplicity, the outlines of the surface vessel is not shown in FIGS. 3A and 3B. FIG. 3C illustrates a perspective view of this wavegate embodiment, showing one view of the aft edge 6 of the back deck of the vessel. The wavegate or wave blocking system 300 may comprise a plurality of steel doors or gates 311, 321. In a first position (see FIG. 3A), the gates may be in a closed position that limits and/or prevents waves from coming over the back deck of the vessel. The dashed lines in FIG. 3A show an open position of the gates. In a second position (see FIG. 3B), the gates may be in an open position, which may be useful if larger equipment is being deployed or if waves are not an issue for the particular operation. The dashed lines in FIG. 3B show a closed position of the gates. In one embodiment, the gates rotate from a closed position to an open position by swinging or hinging on one or more hinges 313, 323. In one embodiment, one end of each door is coupled to the hinge, such that swinging the hinge moves the door. A portion of each door may be fixed and/or located on opposing sides of the vessel. As shown in FIG. 3A, opposing ends of gates 311, 321 may meet at closure point 331. Latching mechanism 332 may lock first gate 311 to second gate 321 at closure point 331. In some embodiments, an opening may be left between the gates so that the gates are not fully closed but only substantially or partially closed. In one embodiment, the mating of first door 311 and second door 321 is done at an obtuse angle alpha ($\alpha$) and/or greater than 90 degrees. In another embodiment, the plurality of doors in a closed position form a V shape. In other embodiments, the coupling of the doors in a closed position forms a substantially linear wall and/or surface, which may be substantially perpendicular to the length of the vessel.

In one embodiment, in an open position the doors are substantially longitudinal with the sides of the vessel. In one embodiment, each door 311, 321 swings approximately 90 degrees from a closed to open position. In other embodiments, the doors swing from approximately 30 degrees to 90 degrees, or more particularly between 60 to 90 degrees, from a closed position to an open position. In one embodiment, each gate is coupled to a hydraulic arm or cylinder 315, 325 that can move the gate from an open position to a closed position. In one embodiment, each cylinder 315, 325 is coupled to linking mechanism 314,324 that is coupled to hinge 313, 323. Thus, actuation of the cylinder extends and retracts (e.g., opens and closes) doors 311, 321. Other actuating devices and/or hinge mechanisms may likewise be used to open and close the doors. In other embodiments, the wavegate doors may rotate or move vertically or fold down on the back deck of the vessel. For example, instead of hinges that rotate the doors horizontally onto opposing sides of the back deck of the marine vessel, hinges or cylinders may rotate the doors vertically from a substantially upright position (approximately 90 degrees relative to the back deck) to a substantially flat position on the back deck (approximately 0 degrees relative to the back deck). In such an embodiment, the wavegate system may comprise only a single door that stretches from each opposing side of the vessel, with each side coupled to a hinge or cylinder. Thus, a wavegate system may comprise one door or a plurality of doors, depending on the particular design of the wavegate system. Still further, each door may comprise a notched opening that allows deployment lines, etc. to pass over the door even if it is in a closed position. While the wavegate may typically be in a fully open and/or closed position, the amount and/or degree of opening and/or closing of the doors may depend on the particular vessel operation.

FIG. 3C illustrates a perspective view schematic of the embodiment of wavegate system 300 from FIG. 3A. As shown in FIG. 3C, the wavegate system 300 may be located on the back deck of the marine vessel 5, near an aft edge 6 of the vessel. In some embodiments, the wavegate system 300 may be located partially off the back deck and/or edge of the vessel, while in other embodiments wavegate system 300 may be located further away from the edge of the vessel. Each door 311, 321 may be coupled to a vertical support member 317, 327, which may be needed for support purposes for each door. Each door 311, 321 may be substantially flat or have different contoured surfaces. While not shown in FIGS. 3A-3C, because of the weight of the doors and the associated structure, strengthening supporting structure may be necessary under the back deck of the vessel to support the weight and force in operations of the wavegates. In some embodiments, a stiff but flexible rubber sheet 319, 329 may be attached to a lower section of each door 311, 321 to cover an opening between the lower edge of the door and the surface of the back deck of the vessel. The flap or sheet 319, 329 may overlap with the deck and prevent excessive water from flowing through the gap between the wavegate and the vessel deck. In one embodiment, the flap or sheep may be a single sheet covering both doors and may be attached to the top surface of the vessel instead of the bottom of the doors. In one embodiment, the flap or sheet is configured to operate as a non-return flap valve, which allows water to free itself from the deck but no significant water flow to enter the deck area.

In one embodiment, the height of the wavegate (and/or doors of the wavegate) is approximately 1 to 2 meters tall, while in other embodiments the height is approximately 1-5 meters tall. In one embodiment, the width of the wavegate is approximately ¼ to ½ the width of the vessel. In other embodiments, the width of the wavegate is between ½ to ¾ the width of the vessel. In still other embodiments, the width of the wavegate is substantially all of the width of the vessel near the rear portion of the back deck of the vessel. In still other embodiments, a plurality of wavegates may be coupled together (as shown in FIG. 4) such that collectively the plurality of wavegates are wider than at least half or up to substantially all of the width of the back deck of the marine vessel.

Figure 4:
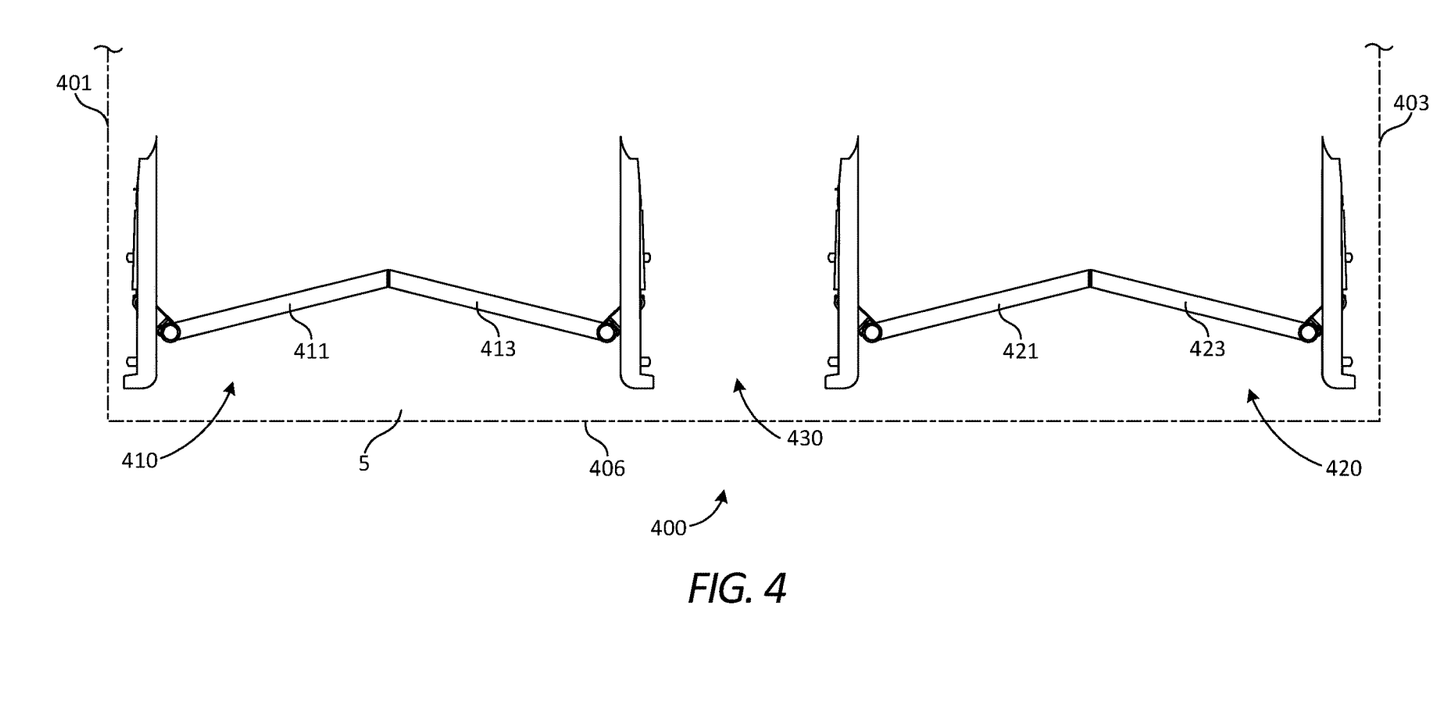
FIG. 4 illustrates one embodiment of a plurality of wavegates on the back deck of a marine vessel.

FIG. 4 illustrates a top view schematic of one embodiment of wavegate system 400 on the back deck of a vessel 5. As shown in FIG. 4, wavegate system 400 may comprise a plurality of wavegates 410, 420 located on or near the aft portion of a vessel 5, each which comprises a plurality of steel doors or gates, similar to the wavegate system 300 described in connection with FIGS. 3A-3C. The dotted line shown in FIG. 4 is representative of exemplary first side 401, second side 403, and back edge 406 of surface vessel 5 and is shown for illustrative purposes only. For example, first wavegate 410 may comprise first door 411 and second door 413, and second wavegate 420 may comprise first door 421 and second door 423. Similar to FIG. 3A, each door may be coupled to a hinge and cylinder for actuation of the door from a closed and open position, and vice versa. In some embodiments, an opening or empty space 430 may be located between wavegate systems 410 and 420, which may allow deployment operations or acoustic source operations (and other operations) to occur between the wavegates while they are in a closed position.

In operation, a surface vessel may be fixed with one or more wavegate systems near the aft edge of a back deck of the vessel. The vessel may deploy a plurality of autonomous seismic nodes or seismic cable from the back deck of the vessel, as well as deploy and/or launch one or more ROVs and/or subsea baskets/cages to facilitate the deployment of the autonomous nodes. Thus, the method of deploying a plurality of autonomous seismic nodes may further include launching at least one remotely operated vehicle (ROV) from the surface vessel and/or at least one underwater basket from the surface vessel. During some or all of the deployment operations, the wavegate system may be actuated and/or operated to prevent waves from crashing the back deck of the vessel during various vessel operations. For example, in forward movement of the vessel, the wavegate system(s) may remain in an open position (or a closed position if desired). During deployment of the autonomous seismic nodes, the wavegate may be moved from an open position to a closed position (if the wavegate is not already in a closed position). Travelling with the wavegate in a closed position helps to substantially limit or prevent waves from crashing onto the back deck of the marine vessel. In one embodiment, the disclosed surface vessel travels in a substantially astern direction (e.g., travels backwards) during seismic operations, such as during deployment of the seismic nodes. A backwards travel of the surface vessel allows a more desirable separation of the basket deployment lines from the ROV deployment lines based on the differential in hydrodynamic drag values and the effect of the different length of tether deployed. In other embodiments, the direction the vessel takes is in the face of incoming waves such that waves are more likely to crash onto the back deck of the vessel. In any event, the disclosed wavegate provides a safer working deck environment no matter what heading is chosen for optimizing the operation.

In one embodiment, the vessel also operates as a seismic shooting vessel, and is thus a hybrid seismic shooting and deployment vessel. During the same time as deployment or subsequent to deployment of a first portion of the seismic nodes, the vessel may then deploy one or more acoustic sources into a body of water and shoot acoustic signals into the water and/or otherwise operate as a shooting vessel. During this time the vessel may need to remain substantially still and/or move backwards, during which point the one or more wavegate systems should be closed to prevent waves from interrupting the operations on the back deck of the marine vessel. Rather than having the vessel moves backwards with a certain speed, in some cases the threat of significant wave impact is created simply be orienting the vessel so that the aft end faces into the predominant water flow, such as when operating in a significant tidal stream. After the seismic survey has been completed, the deployed autonomous seismic nodes may need to be retrieved. The same vessel that deployed the nodes may be used, or in other embodiments a separate vessel may be used. The retrieval vessel may similarly be equipped and/or use one or more wavegates in a similar fashion as described above. Thus, during all or portions of the seismic survey, the one or more wavegates may be operated to move into a closed position to prevent waves from interfering with operations on the back deck of the vessel, which increases operation safety and performance.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of autonomous seismic unit, wavegate, and surface vessel, as well as other disclosed features, are within the scope of the invention. For example, the autonomous seismic unit may be of any configuration, may or may not be coupled to an underwater vehicle, may or may not be coupled to a deployment line (thereby not requiring an ROV), and may or may not couple to the seabed during seismic recordings. As another example, any type of underwater vehicle may be used to deploy the autonomous seismic nodes to the seabed, including but not limited to ROVs, AUVs, and other underwater vehicles, and an underwater subsea basket may or may not be utilized for node deployment. As still another example, the disclosed wavegates are not necessarily limited to seismic vessels, and may be utilized on any surface vessel where vessel direction and/or waves crashing to the back deck of the vessel prevent or limit operations from the back deck. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system for the deployment of seismic nodes in a body of water, comprising:

One or more wavegates installed on a back deck at an aft portion of a seismic surface vessel, wherein the one or more wavegates is moveable between a closed position and an open position, wherein the closed position substantially prevents waves from crashing onto the back deck of the surface vessel during vessel operations.

2. The system of claim 1, wherein the one or more wavegates is configured to prevent waves from substantially crashing onto the back deck of the marine vessel while the surface vessel travels backwards.

3. The system of claim 1, wherein the one or more wavegates comprises a plurality of doors.

4. The system of claim 3, wherein the plurality of doors forms an obtuse angle in the closed position.

5. The system of claim 3, wherein each of the plurality of doors is located on an opposite side of the surface vessel in the open position.

6. The system of claim 3, wherein each of the plurality of doors is located in a substantially flat position along the back deck of surface vessel in the open position.

7. The system of claim 1, wherein the closed position comprises a substantially straight wall section formed by the one or more wavegates that is substantially perpendicular to the length of the vessel.

8. The system of claim 1, wherein the one or more wavegates comprises a plurality of wavegates and an open section located between the plurality of wavegates sized for allowing subsea equipment to be raised and lowered from the back deck of the marine vessel through the open section.

9. The system of claim 1, wherein the one or more wavegates is coupled to at least one actuating device that is configured to move the one or more wavegates between the open position and the closed position.

10. The system of claim 1, wherein the one or more wavegates is approximately between one to five meters tall.

11. The system of claim 1, wherein a width of the one or more wavegates is approximately/to substantially all of the width of the back deck of the marine vessel.

12. The system of claim 1, wherein the one or more wavegates comprises two wavegates, wherein a width of each of the two wavegates is approximately ¼ to ½ the width of the back deck of the marine vessel.

13. The system of claim 1, wherein the surface vessel is a hybrid seismic shooting and deployment vessel.

14. The system of claim 1, further comprising
one or more ROV deployment systems located on the back deck at a first location, and
one or more subsea basket deployment systems located on the back deck at a second location, wherein the second location is located astern to the first location.

15. A method for the deployment of seismic nodes in a body of water, comprising:
Deploying a plurality of autonomous seismic nodes in a body of water from a marine surface vessel; and
Preventing waves from substantially hitting the back deck of the marine vessel by using one or more wave gates installed on the back deck at an aft section of the marine vessel while deploying the plurality of autonomous seismic nodes.

16. The method of claim 15, further comprising moving the one or more wavegates from an open position to a closed position for deployment of the plurality of autonomous seismic nodes.

17. The method of claim 15, further comprising shooting one or more acoustic signals into the body of water from the surface vessel while the one or more wavegates are in a closed position.

18. The method of claim 15, further comprising operating the surface vessel in a direction that causes waves to hit the back deck of the surface vessel while the one or more wavegates are in a closed position.

19. The method of claim 18, wherein the direction is substantially backwards or in the face of incoming waves.

20. A method for the deployment of subsea devices in a body of water, comprising:
Deploying one or more subsea devices in a body of water from a marine surface vessel; and
Preventing waves from substantially hitting the back deck of the marine vessel by using one or more wavegates installed on a back deck at an aft portion of the marine vessel while performing subsea operations with the one or more subsea devices.

* * * * *